No. 845,499. PATENTED FEB. 26, 1907.
G. W. WILLIAMS, Sr.
SHIELD FOR RAILROAD SWITCHES.
APPLICATION FILED OCT. 30, 1906.
2 SHEETS—SHEET 1.
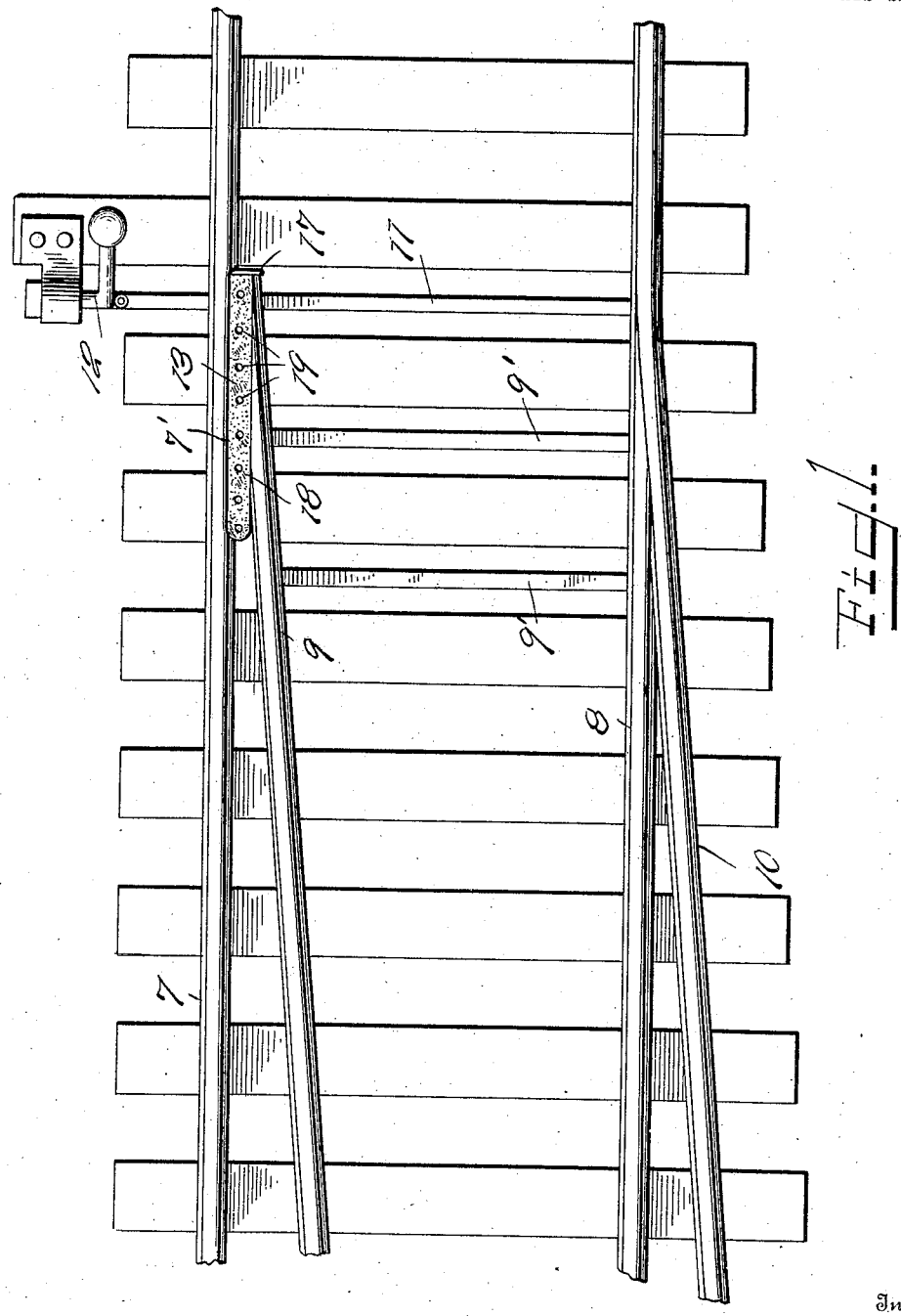
Witnesses
G. R. Thomas
H. P. McG...
Inventor
G. W. Williams Sr.
By 
Attorneys
THE NORRIS PETERS CO., WASHINGTON, D. C.

No. 845,499. PATENTED FEB. 26, 1907.
G. W. WILLIAMS, Sr.
SHIELD FOR RAILROAD SWITCHES.
APPLICATION FILED OCT. 30, 1906.
2 SHEETS—SHEET 2.
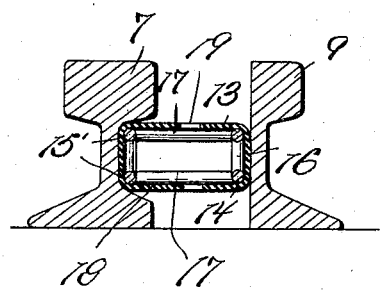
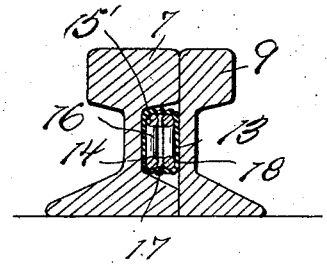
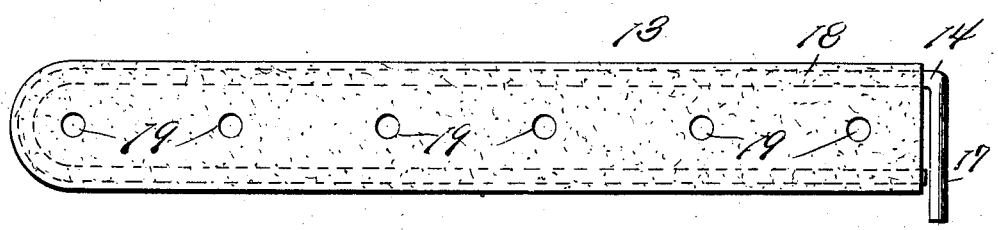
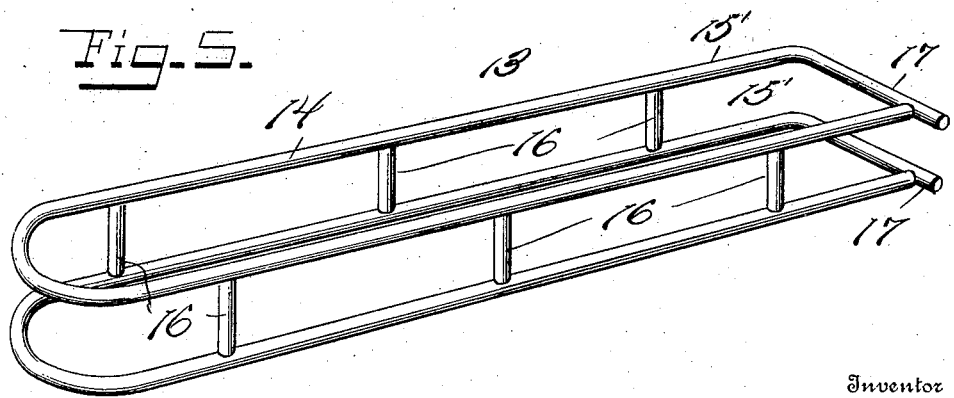

UNITED STATES PATENT OFFICE.

GEORGE W. WILLIAMS, SR., OF ROSE HILL, ILLINOIS.

SHIELD FOR RAILROAD-SWITCHES.

No. 845,499. Specification of Letters Patent. Patented Feb. 26, 1907.

Application filed October 30, 1906. Serial No. 341,207.

*To all whom it may concern:*

Be it known that I, GEORGE W. WILLIAMS, Sr., a citizen of the United States, residing at Rose Hill, in the county of Jasper, State of Illinois, have invented certain new and useful Improvements in Shields for Railroad-Switches; and I do hereby declare the following to be a full, clear, and exact description of the invention, such as will enable others skilled in the art to which it appertains to make and use the same.

The present invention, which relates to shields for railroad-switches, has for its object to provide a device of that nature adapted to be secured between a main-rail section and the adjacent side-rail section of a switch to prevent the accumulation of snow, ice, or the like therebetween and the consequent failure of proper action of the switch.

In certain sections of this and other countries, where the fall of snow is exceptionally heavy and of great frequency, much trouble has been experienced in the operation of switches on railroads due to the accumulation of ice, snow, and the like between the rail-sections forming the switch, the snow, &c., becoming packed into a dense mass therebetween, which prevents the movable rail from being operated and which is only removed with considerable difficulty.

To obviate this difficulty, the present device has been constructed, which, briefly described, consists of a pair of U-shaped frames formed of resilient metal connected together and adapted to normally bear against the inner faces of the rails, the frames being provided with a covering of some elastic material, such as rubber, embracing the same and having a series of perforations therein to permit the water as it forms from the mass to escape therethrough.

The invention will be readily understood from a consideration of the following detailed description and the annexed drawings, in which like parts are designated by corresponding reference-numerals in the several views.

Of the said drawings, Figure 1 is a plan view of a railroad-switch in closed position, showing the shield secured in place between the stationary rail and the adjacent movable switch-rail. Fig. 2 is a transverse section taken on the line 2 2 of Fig. 1. Fig. 3 is a similar section showing the position of the frame members of the shield when the switch is open. Fig. 4 is an enlarged plan view of the shield with its cover in place. Fig. 5 is a perspective view of the framework of the shield with the cover removed.

Referring more particularly to the drawings, 7 and 8 designate, respectively, the stationary and movable main rails, and 9 and 10 the movable and stationary side rails. Rails 8 and 9 are connected by the transverse braces 9' and are moved by the operating-lever 11 of any preferred description, having a handle portion 12. The main rail 7 is slightly cut away on the inner edge of its tread portion, as indicated by the numeral 7', the inclined edge of the rail 9 fitting in such cut-away portion to enable the train-wheels to pass easily thereover when the switch is open.

Located between the rails 7 and 9 at the point at which said rails meet when the switch is open is a shield, generally designated 13, comprising upper and lower U-shaped frames 14, formed of resilient metal and connected by clamps 16 intermediate the bight and ends thereof. The ends of the arms 15' of the U-shaped frames are bent laterally inward, as indicated by the reference-numeral 17, such inbent ends forming stops under which the ends of the opposite arms fit when the switch is open. The framework of the shield—*i. e.*, the metal frames—is covered by a strip of elastic material 18, which is stretched around the same and secured thereto in any preferred manner, the top or upper portion of said covering having a series of openings 19 formed therein.

In practice the shield is disposed, as above stated, between the point of contact of the rails 7 and 9 below the tread portion of the same. By such disposition of the shield the wheels of the cars as they pass over the rails cannot contact with the shield-covering and tear or otherwise injure the same. The covering of the shield is preferably formed of sheet-rubber, although any other elastic material may be used for the same purpose. When the switch is closed, as shown in Fig. 1, the arms of the U-shaped frames will contact with the inner faces of the rail and hold the shield in place, owing to their resiliency, and when the switch is open the movement of the rail 9 toward the rail 7 will force the arms 15' of the frames toward their opposite arms, when the inbent ends 17 of the arms 15' will pass over the opposite arms and prevent any upward movement of the latter.

From the above it will be readily understood that the disposition of the shield as described will prevent the accumulation of ice or snow between the rails, and thus allow the movable rails to be easily operated through the actuating-lever. The openings formed in the covering will permit water given off from the snow or ice as the latter melts to pass therethrough, preventing a further formation of ice.

While a single shield has been shown as in place between the rails 7 and 9, it will be understood that a second shield may be placed between the rails 8 and 10, if desired.

What is claimed is—

1. The combination of the main and switch rails, and a shield secured between a main rail and the adjacent switch-rail to prevent the accumulation of snow and ice therebetween; said shield being provided with a series of perforations to permit the passage of water therethrough.

2. The combination of the main and switch rails, and a shield secured between a main rail and the adjacent switch-rail to prevent the accumulation of snow and ice therebetween; said shield comprising a flexible framework and a covering for the same.

3. The combination of the main and switch rails, and a shield secured between a main rail and the adjacent switch-rail to prevent the accumulation of snow and ice therebetween; said shield comprising a flexible framework and an elastic covering embracing the same.

4. The combination of the main and switch rails, and a shield secured between a main rail and the adjacent switch-rail to prevent the accumulation of snow and ice therebetween; said shield comprising a flexible framework and an elastic covering embracing the same, said covering having a series of openings formed therein to permit the passage of water therethrough.

5. The combination of the main and switch rails, and a shield secured between a main rail and the adjacent switch-rail to prevent the accumulation of snow and ice therebetween, said shield comprising a framework formed of upper and lower flexible members connected together and an elastic covering embracing the same.

6. The combination of the main and switch rails, and a shield adapted to be secured between a main rail and the adjacent switch-rail below the tread of said rails to prevent the accumulation of snow and ice therebetween, said shield comprising a framework formed of spaced resilient members adapted to normally contact with the inner faces of said rails, and an elastic covering embracing said framework.

In testimony whereof I affix my signature in presence of two witnesses.

GEORGE W. WILLIAMS, Sr.

Witnesses:
JOHN F. DAVISON,
JAMES DARLING.